(12) United States Patent
Wang et al.

(10) Patent No.: US 7,299,180 B2
(45) Date of Patent: Nov. 20, 2007

(54) NAME ENTITY EXTRACTION USING LANGUAGE MODELS

(75) Inventors: Zhong-Hua Wang, Yorktown Heights, NY (US); David Lubeneky, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 10/315,400

(22) Filed: Dec. 10, 2002

(65) Prior Publication Data

US 2004/0111264 A1 Jun. 10, 2004

(51) Int. Cl.
*G10L 15/18* (2006.01)
*G10L 15/28* (2006.01)

(52) U.S. Cl. .................................... 704/257; 704/255
(58) Field of Classification Search ..................... None
See application file for complete search history.

(56) References Cited

U.S. PATENT DOCUMENTS

| | | | | |
|---|---|---|---|---|
| 5,644,680 | A * | 7/1997 | Bielby et al. | 704/240 |
| 6,052,682 | A * | 4/2000 | Miller et al. | 707/3 |
| 6,076,054 | A * | 6/2000 | Vysotsky et al. | 704/240 |
| 6,311,152 | B1 * | 10/2001 | Bai et al. | 704/9 |
| 2003/0208354 | A1 * | 11/2003 | Lin et al. | 704/9 |
| 2004/0162729 | A1 * | 8/2004 | Strong | 704/259 |

OTHER PUBLICATIONS

Bikel, D. Schwartz, R. Weischedel, R. "An algorithm that learns what's in a name" Machine Learning pp. 211-213, 1999.*
Gotoh, Y. Renals, S. Williams, G. "Named entity tagged language models" Acoustics, Speech and Signal Processing pp. 513-516, Mar. 1999.*
Bikel, D. Miller, S. Schwartz, R. Weischedel, R. "Nymble: a high-performance learning name-finder" Proceedings in the 5th conference on applied natural language processing, pp. 194-201, 1997.*
Brill, E. "Transformation-based error-driven learning and natural language processing: A case study in part of speech tagging", Computational Linguistics, 1995.□□.*
Collins, M. Singer, Y. "Unsupervised models for named entity classification", Conference on Empiracal Methods in NLP and Very Large Corpora, 1999, pp. 100-110.*

* cited by examiner

*Primary Examiner*—David Hudspeth
*Assistant Examiner*—Matthew J. Sked
(74) *Attorney, Agent, or Firm*—Duke W. Yee; Anne V. Dougherty; Theodore D. Fay, III (57) ABSTRACT

A name entity extraction technique using language models is provided. A general language model is provided for the natural language understanding domain. A language model is also provided for each name entity. The name entity language models are added to the general language model. Each language model is considered a state. Probabilities are applied for each transition within a state and between each state. For each word in an utterance, the name extraction process determines a best current state and a best previous state. When the end of the utterance is reached, the process traces back to find the best path. Each series of words in a state other than the general language model state is identified as a name entity. A technique is provided to iteratively extract names and retrain the general language model until the probabilities do not change. The name entity extraction technique of the present invention may also use a general language model with uniform probabilities to save the time and expense of training the general language model.

20 Claims, 5 Drawing Sheets

NAME ENTITY EXTRACTION USING LANGUAGE MODELS

BACKGROUND OF THE INVENTION

1. Technical Field

The present invention relates to natural language understanding and, in particular, to name entity extraction. Still more particularly, the present invention provides a method, apparatus, and program for name entity extraction using language models (N-gram and/or finite-state language model).

2. Description of Related Art

The task of name entity extraction is to retrieve name entities from text documents or natural language utterances. Much research has been done in this area. Existing techniques for name entity extraction include, for example, rule based methods, decision tree approach, Hidden Markov model (HMM) technique, Maximum Entropy approach, and Finite-state transducer.

Most of the currently existing name entity extraction methods rely on a model that is trained or developed based on a large amount of manually annotated text data. These techniques have several problems. A sufficient amount of text data needs to be collected, which is expensive in both time and money. Also, data annotation requires substantial amount of time and human effort. Usually, a good model requires the training data to be consistently annotated, which in practice is a luxury requirement, especially when multiple persons participate in the annotation simultaneously and when the annotation process spans over a long period of time. Furthermore, the collected text data is usually domain-dependent and so is the trained model, which could not be reused or easily applied to other domains of applications. These problems make the development work very expansive and the development process very long even for a simple natural language application, such as a mutual fund trading system or air travel system.

Therefore, it would be advantageous to provide an improved name entity extraction technique that provides accurate results without excessive language model training efforts.

SUMMARY OF THE INVENTION

The present invention provides a name entity extraction technique using language models. A general language model is provided for the natural language understanding domain. A language model is also provided for each name entity. The name entity language models are added to the general language model. Each language model is considered a state. Probabilities are applied for each transition within a state and between each state. For each word in an utterance, the name extraction process determines a best current state and a best previous state. When the end of the utterance is reached, the process traces back to find the best path. Each series of words in a state other than the general language model state is identified as a name entity. The present invention also provides a technique for iteratively retraining the general language model. The name entity extraction technique is used to extract name entities from a corpus of training sentences. The name entities are replaced with name entity labels in the training sentences and the general language model is retrained using these sentences. The process iteratively extracts names and retrains the general language model until the probabilities do not change. The name entity extraction technique of the present invention may also use a general language model with uniform probabilities to save the time and expense of training the general language model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
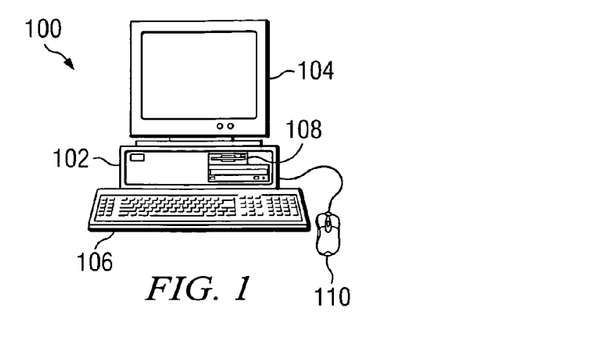
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
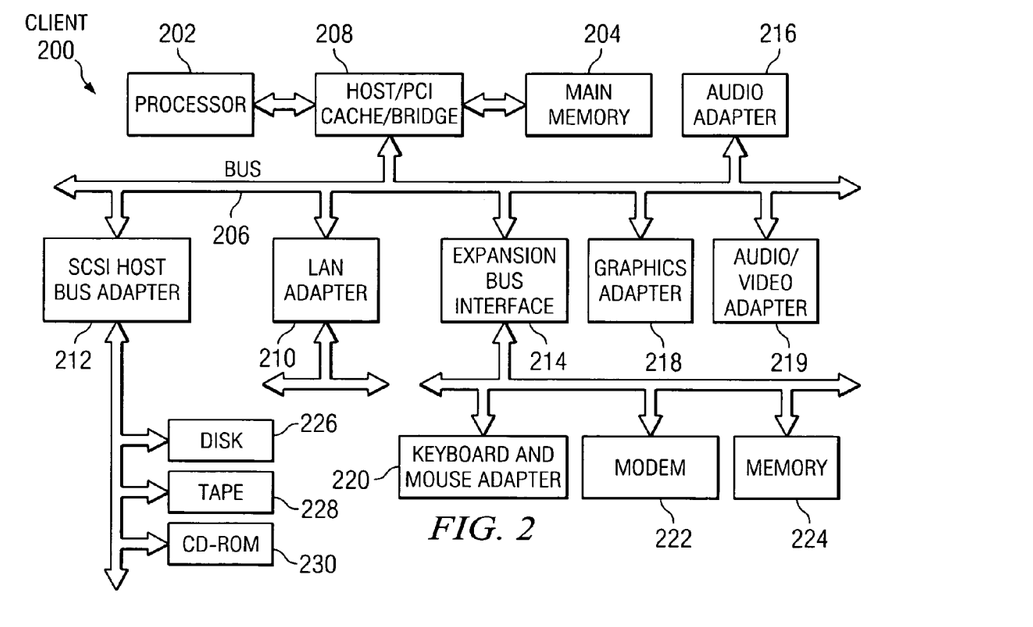
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
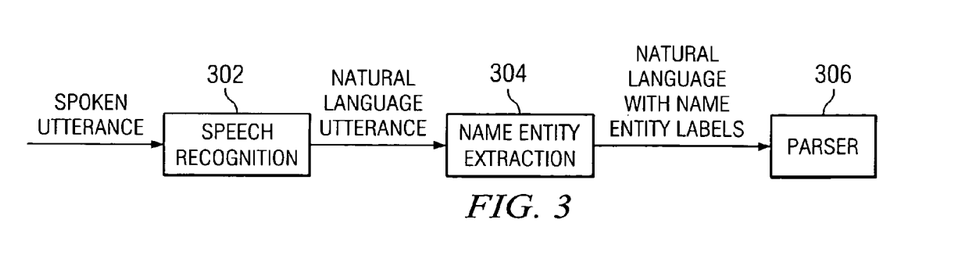
FIG. 3 depicts a natural language understanding application in accordance with a preferred embodiment of the present invention.

With reference to FIG. 3, a natural language understanding application is shown in accordance with a preferred embodiment of the present invention. Speech recognition unit 302 receives a spoken utterance. The speech recognition unit converts the spoken utterance into a natural language text. Name entity extraction mechanism 304 receives the natural language text and extracts name entities. A name entity is a recognizable, meaningful entity in the text, such as a dollar amount, a city, or a date. Name entity extraction mechanism 304 may insert labels in place of or in association with the words that make up the name entity. Parser 306 receives the natural language text with name entity labels and parses the utterance to perform a natural language understanding operation. The natural language understanding application or, more particularly, the name entity extraction mechanism may be implemented on a computer, such as computer 100 in FIG. 1.

The present invention provides a name entity extraction technique using language models. Each kind of name entity is represented by a language model such as an N-gram language model or a finite-state language model. Another language model, called general language model, is introduced to represent the patterns of natural language utterances. The general language model encodes the linguistic information among the name entities and other words in the vocabulary. Consequently, if there are K types of name entities, then there are (K+1) language models in total. During decoding, each language model is regarded as one state. Given an utterance, a word in the utterance could be aligned with any state. The Viterbi algorithm is applied to find out the most probable state sequence aligning with the word sequence. Any contiguous words aligned with a state other than the state of the general language model are tagged and labeled as the corresponding name entity.

In accordance with a preferred embodiment of the present invention, the language model for a name entity is either a finite-state or an N-gram language model. The latter is trained using the text data of that specific name entity. Therefore, the model for the name entity is domain-independent. However, the general language model is trained using a set of domain-dependent natural language utterances. Therefore, it is domain-dependent. In an alternate embodiment, a uniform bigram language model is used as the general language model, where the probability between any pair of words is equal to a preset constant value. This uniform bigram language model is not only domain-independent, but also it does not require any data to train a weighted general language model, and the vocabulary size is unlimited. However, if some domain specific data is available, this algorithm could be applied to iteratively decode the raw sentences and refine the models, and thereby to improve the performance of the name entity recognition system.

In accordance with a preferred embodiment of the present invention, the back-off bigram language model or finite-state language model is used to capture the local context information of a name entity. The generalization from bigram to N-gram (N≧3) language models and other smoothing techniques is straightforward. In order to present the algorithm, one must introduce some basic concepts and some convections used in the present invention.

The pattern of a natural language utterance is defined as the corresponding utterance with the interested name entities represented by the corresponding labels. In the examples shown below, normal words in a natural language utterance are written in lower case, while the labels are written in upper case. The following are example natural language utterances and their corresponding patterns, where AMOUNT, SHARES, and FUND are the labels for the name entities of the types of dollar amount, share amount, and fund names, respectively:

Original utterance: i want to buy two hundred dollars of fidelity magellan

Pattern: i want to buy AMOUNT of FUND

Original utterance: transfer twenty shares from my magellan account to vanguard account Pattern: transfer SHARES from my FUND account to FUND account The pattern of a natural language utterance is the one with all the interested name entities represented by the corresponding labels. "Fidelity magellan" and "magellan" are labeled as FUND names, "twenty shares" is labeled as SHARES names and "two hundred dollars" is labeled as AMOUNT names.

A bigram language model is defined by a vocabulary and probabilities for any pair of words. In the back-off bigram language model, if a word pair appears too infrequent in the training data, its bigram probability will be "backed-off" to the unigram probability. Similarly, if a word appears too infrequent, its unigram probability will be backed-off to the uniform distribution. Mathematically, the unigram probability for a word $w_i$ could be defined as:

$$P(w_i) = \begin{cases} N(w_i)/N & \text{if } N(w_i) > u, \\ u/N & \text{otherwise,} \end{cases} \quad (1)$$

where u is a constant; $N(w_i)$ is the number of times the word $w_i$ appears in the training corpus; $N=\Sigma_{j \in A}N(w_j)+\Sigma_{j \in \overline{A}}u$, where A is the set of words $w_j$ that satisfy $N(w_j)>u$ and $\overline{A}$ is the set of words not belonging to A in the pre-defined vocabulary.

The bigram probability for each word-pair $(w_i, w_j)$ is defined as:

$$P(w_j|w_i) = \begin{cases} N(w_i, w_j)/N(w_i) & \text{if } N(w_i, w_j) > t, \\ b(w_i)p(w_j) & \text{if } N(w_i, w_j) \le t \text{ and } N(w_i) > 0, \end{cases} \quad (2)$$

where t is a constant, $N(w_i, w_j)$ is the number of occurrences $w_j$ follows $w_i$ in the training corpus; $b(w_i)$ is the back-off weight which is calculated to ensure $\Sigma_{j=1}^{|V|}P(w_j|w_i)=1$. Therefore, $$b(w_i) = \frac{1 - \sum_{j \in B_i} P(w_j|w_i))}{1 - \sum_{j \in B_i} P(w_j)}$$

where $B_i$ is the set of all words $w_j$ for which $N(w_i, w_j)>t$, and where both u and t are set to 1.

A finite-state language model is a finite-state automata defined by a sextuple $(Q, \Sigma, I, T, \delta, Z)$ where $Q=(q_1, \ldots, q_N)$ is a finite set of states, $\Sigma$ is the vocabulary, I is the initial state, T is the terminal state, $\delta$ is the transition function, and Z is the probability function. There are arcs transiting from one state to other states. An arc originating from a state q is associated with one symbol w, the associated probability $Z(w|q)$. Each continuous path across the finite-state automata originating from the initial state and ending at the final state is called a complete path, and all the other paths are called partial paths. The word sequence corresponding to a complete path represents a legal utterance defined by this finite-state language model.

Figure 4:
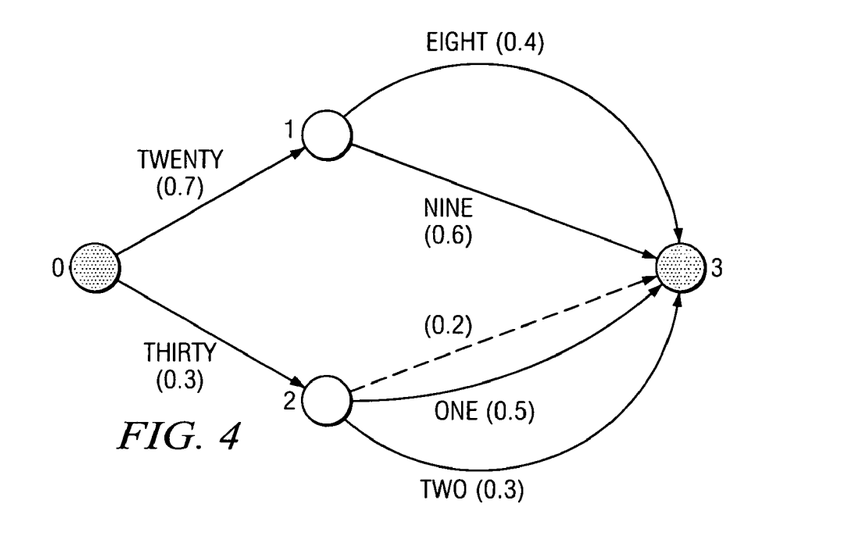
FIG. 4 illustrates an example of a finite-state language model for the integer numbers between twenty-eight and thirty-two in accordance with a preferred embodiment of the present invention.

FIG. 4 illustrates an example of a finite-state language model for the integer numbers between twenty-eight and thirty-two in accordance with a preferred embodiment of the present invention. Dotted lines represent a transition without emitting any word. Each word represents an arc emitting the specified word with the probability being equal to the number. In a back-off N-gram language model, any sequence of words in the vocabulary are legal utterances. However, in a finite-state language model, only those word sequences corresponding to a complete path are legal utterances.

Figure 5:
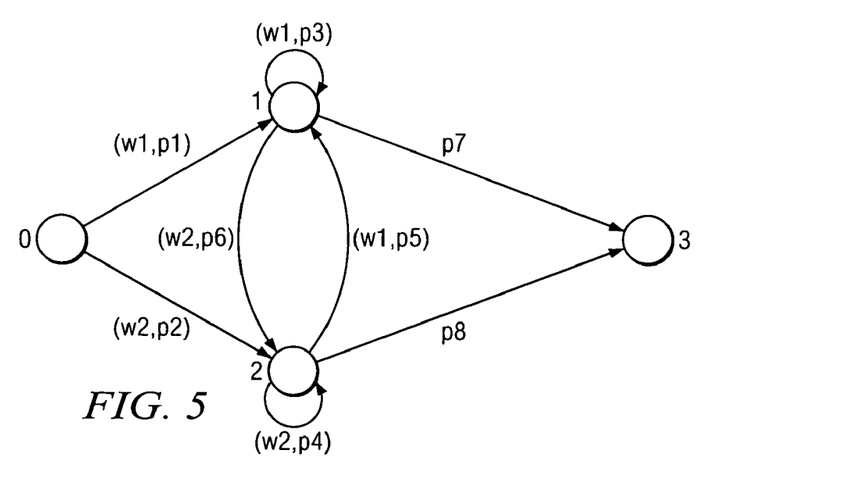
FIG. 5 illustrates an example of a finite-state language model equivalent to a bigram language model with the vocabulary of two words in accordance with a preferred embodiment of the present invention.

On the other hand, a bigram language model with vocabulary size N may be represented by a finite-state language model with N states together with an initial state and a terminal state. Any transition from the initial state to the i-th $(1 \le i \le N)$ state generates word $w_i$ with probability P($w_i$|UTT_START), where UTT_START represents the starting symbol of an utterance, P is the bigram probability. A transition from the i-th state to the terminal state leads to the end of the utterance with the probability of P(UTT_END|$w_i$), where UTT_END represents the ending symbol of an utterance. A transition from i-th state to j-th state ($1 \leq i, j \leq N$) generates $w_j$ with probability P($w_j$|$w_i$). FIG. 5 illustrates an example of a finite-state language model equivalent to a bigram language model with the vocabulary of two words in accordance with a preferred embodiment of the present invention.

Given K kinds of interested name entities, each type of name entity is represented by a bigram or a finite-state language model. Together with the general language model, there are (K+1) language models in total. During decoding, each language model is regarded as one state. Therefore, there are (K+1) states, denoted as $s_0, s_1, \ldots, s_K$ with $s_0$ denoting the state for the general language model and $s_i$ ($i \geq 1$) the state for the language model of the i-th name entity. Each language model has its specific starting and ending words of an utterance, denoted as $ENT_i$-START and $ENT_i$_END for the i-th ($1 \leq i \leq N$) name entity, and GENERAL_START and GENERAL_END for the general language model.

Given the assumption that a sufficient amount of natural language utterances is annotated and replacing the name entities by the corresponding labels, denoted as $ENT_i$ ($1 \leq i \leq K$), one gets the patterns of the natural language utterances which can be used to train a bigram language model for the general language model where $ENT_i$ are words of the vocabulary. Denoting a natural language utterance as a sequence of words $W = w_1, w_2, \ldots, w_n$ which may or may not contain any name entities, then at any time t($1 \leq t \leq n$), the word $w_t$ is assumed to be aligned with the state $S_t$ ($S_t = s_0, \ldots, s_K$).

Figures 6A, 6B:
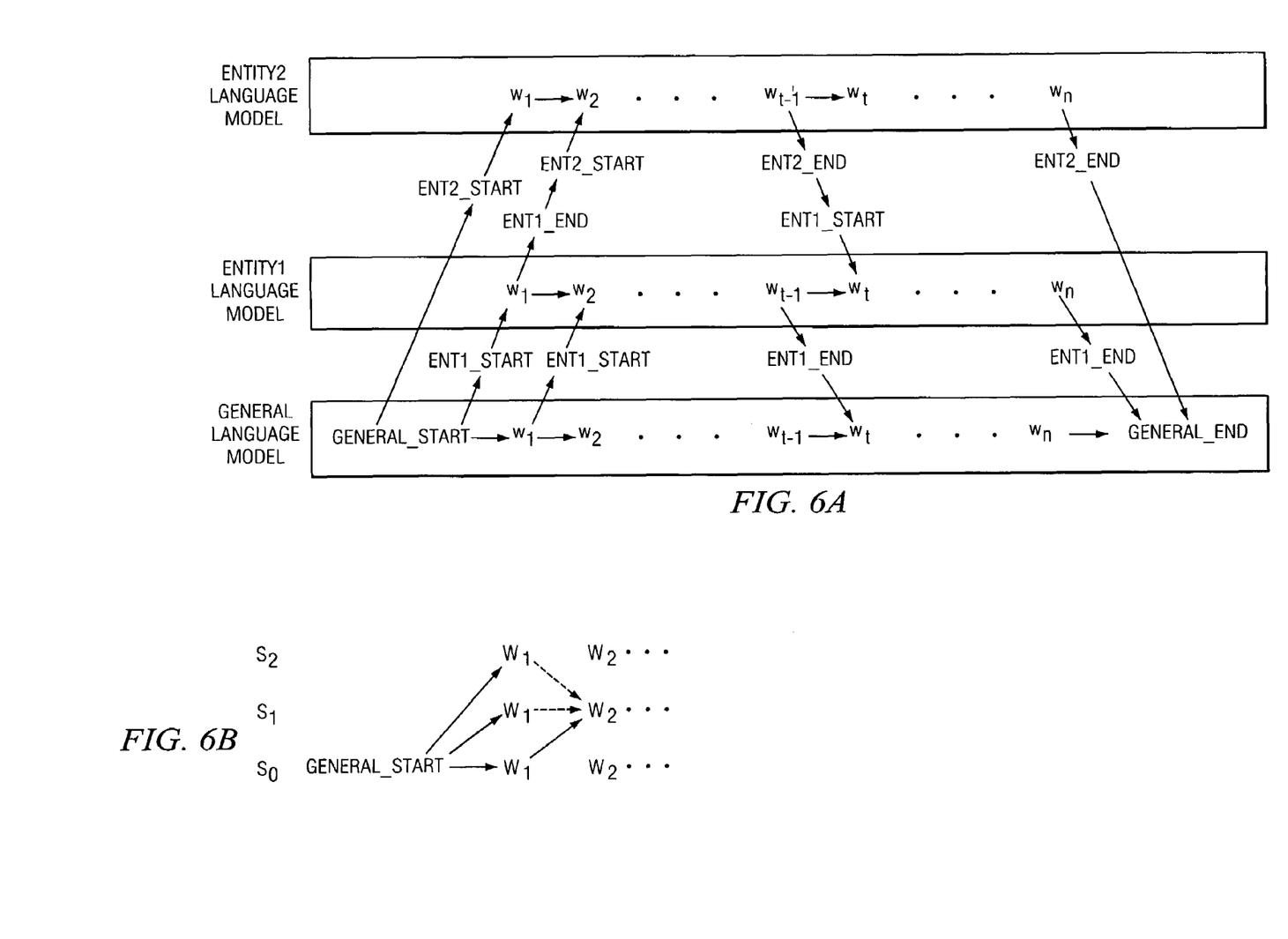
FIGS. 6A and 6B illustrate a general language model and two name entity language models in accordance with a preferred embodiment of the present invention.

With reference now to FIG. 6A, a general language model and two name entity language models are shown in accordance with a preferred embodiment of the present invention. A transition from $w_{t-1}$ to $w_t$ involves the state transition from $S_{t-1}$ to $S_t$. Suppose the probability transiting to $w_t$ at state $S_t$ only depends on the previous word $w_{t-1}$ and the corresponding state $S_{t-1}$, the transition probability can be written as P($w_t, S_t$|$w_{t-1}, S_{t-1}$). From FIG. 6A, one sees that a transition from $s_0$ to $s_i$ (i≠0) at time t means that $w_t$ is the first word of the i-th name entity, a transition from $s_i$(i≠0) to $s_0$ at time t means that $w_t$ is the last word of the i-th name entity, a transition from $s_i$ to $s_j$(i≠j, i≠0, j≠0) at time t means that $w_{t-1}$ is the last word of the i-th name entity and $w_t$ is the first word of the j-th name entity.

The probability P($w_t, S_t$|$w_{t-1}, S_{t-1}$) may be rewritten as $$P(w_t, S_t|w_{t-1}, S_{t-1}) = P(w_t|w_{t-1}, S_t, S_{t-1})P(S_t|w_{t-1}, S_{t-1}) \quad (3)$$

where P($w_t$|$w_{t-1}, S_t, S_{t-1}$) is the probability transiting from $w_{t-1}$ to $w_t$ conditioned on states $S_{t-1}$ and $S_t$, while P($S_t$|$w_{t-1}, S_{t-1}$) is the probability transiting from state $S_{t-1}$ to $S_t$ conditioned on $w_{t-1}$. The probabilities should satisfy the unitary conditions:

$$\sum_{w_t} P(w_t|w_{t-1}, S_t, S_{t-1}) = 1, \quad \sum_{S_t} P(S_t|w_{t-1}, S_{t-1}) = 1. \quad (4)$$

Depending on $S_{t-1}$ and $S_t$, P($w_t$|$w_{t-1}, S_t, S_{t-1}$) may be defined using the probability of the general language model, denoted by G, and those for the name entities, denoted by $E_i$ ($1 \leq i \leq K$):

$$P(w_t|w_{t-1}, S_t, S_{t-1}) = \quad (5)$$

$$\begin{cases} G(w_t|w_{t-1}), & \text{if } S_{t-1} = S_t = s_0, \\ E_i(w_t|ENT_i\_START), & \text{if } S_{t-1} = s_0, S_t = s_i \neq s_0, \\ G(w_t|ENT_i\_END), & \text{if } S_{t-1} = s_i \neq s_0, S_t = s_0, \\ E_j(w_t|ENT_j\_START), & \text{if } S_{t-1} = s_i \neq s_0, S_t = s_j \neq s_0, s_i \neq s_j, \\ E_i(w_t|w_{t-1}), & \text{if } S_{t-1} = S_t = s_i \neq s_0. \end{cases}$$

where G($w_t$|$ENT_i$_END) = G($w_t$|$ENT_i$). If the i-th name entity is represented by a finite-state language model ($Q_i, \Sigma_i, I_i, T_i, \delta_i, Z_i$), the corresponding language model i probabilities are express as:

$E_i(w_t|ENT_i\_START) = Z_i(w_t|I_i)$, with $\hat{q}_{i,t} = \delta(w_t, I_i)$, $E_i(ENT_i\_END|w_t) = Z_i(w_t|\hat{q}_{i,t-1})$, with $\hat{q}_{i,t} = \delta_i(w_t|\hat{q}_{i,t-1}) = T_i$ $E_i(w_t|w_{t-1}) = Z_i(w_t|\hat{q}_{i,t-1})$, with $\hat{q}_{i,t} = \delta_i(w_t, \hat{q}_{i,t-1})$. \quad (6)

In this case, one must keep track of the internal state of the language model at each time t when calculating the trellis scores.

Similarly, P($S_t$|$S_{t-1}, w_{t-1}$) may be defined as:

$$P(S_t|S_{t-1}, w_{t-1}) = \quad (7)$$

$$\begin{cases} 1 - \sum_{i=1}^{K} \alpha_i G(ENT_i\_START|w_{t-1}), & \text{if } S_{t-1} = S_t = s_0, \\ \alpha_i G(ENT_i\_START|w_{t-1}), & \text{if } S_{t-1} = s_0, S_t = s_i \neq s_0, \\ \beta_i E_i(ENT_i\_END|w_{t-1}), & \text{if } S_{t-1} = s_i \neq s_0, S_t = s_0, \\ \gamma_{ij} G(ENT_j\_START|ENT_i\_END)E_i(ENT_i\_END|w_{t-1}), & \text{if } S_{t-1} = s_i \neq s_0, S_t = s_j \neq s_0, s_i \neq s_j, \\ 1 - \beta_i E_i(ENT_i\_END|w_{t-1}) - \sum_{j \neq i, j \neq 0} \gamma_{ij} \\ G(ENT_j\_START|ENT_i\_END)E_i(ENT_i\_END|w_{t-1}), & \text{if } S_{t-1} = S_t = s_i \neq s_0, \end{cases}$$

where $G(ENT_j\_START|ENT_i\_END)=G(ENT_j|ENT_i)$, $G(ENT_i\_START|w_{t-1})=G(ENT_i|w_{t-1})$, $E_{is}$ are represented in equation (6), $\alpha_i$, $\beta_i$ and $\gamma_{ij}$ ($1 \le i \le K$) are redundant constant parameters constrained by equation (4) and $$0 \le P(S_t|S_{t-1}, w_{t-1}) \le 1.$$

These parameters may be used to control state transitions. Usually, $\alpha_i$s are set to some large values so that transition from the state of the general language model to the state of name entities are encouraged, $\beta_{is}$ and $\gamma_{is}$ are set to some small values so that a transition away from the state for a name entity is discouraged, and staying in the state for a name entity is encouraged. Because of this, the decoder prefers longer names than shorter names.

Substituting Equation (5) and (7) into (3), we get the state transition probability $$P(w_t, S_t|S_{t-1}, w_{t-1}) = P(w_t|w_{t-1}, S_t, S_{t-1})P(S_t|S_{t-1}, w_{t-1}) = \qquad (8)$$

$$\begin{cases} \left[1 - \sum_{i=1}^{K} \alpha_i G(ENT_i\_START|w_{t-1})\right] G(w_t|w_{t-1}), & \text{if } S_{t-1} = S_t = s_0, \\ \alpha_i G(ENT_i\_START|w_{t-1})E_i(w_t|ENT_i\_START), & \text{if } S_{t-1} = s_0, S_t = s_i \ne s_0, \\ \beta_i E_i(ENT_i\_END|w_{t-1})G(w_t|ENT_i\_START), & \text{if } S_{t-1} = s_i \ne s_0, S_t = s_0, \\ \gamma_{ij} G(ENT_j\_START|ENT_i\_END)E_i(ENT_i\_END|w_{t-1}), & \text{if } S_{t-1} = s_i \ne s_0, S_t = s_j \ne s_0, s_i \ne s_j, \\ \left[1 - \beta_i E_i(ENT_i\_END|w_{t-1}) - \sum_{j \ne i, j \ne 0} \gamma_{ij}\right] & \text{if } S_{t-1} = S_t = s_t \ne s_0, \\ G(ENT_j\_START|ENT_i\_END)E_i(ENT_i\_END|w_{t-1})]E_i(w_t|w_{t-1}), \end{cases}$$

If a pair formed by a language model state and a word identity is regarded as one state, the finite-state machine with probability defined by equation (8) represents an ergodic Markov chain.

Given a word sequence $W=w_1, w_2, \ldots, w_n$, and a set of name entities each of which is associated with a language model, the task of name entity extraction is to discover a state sequence $S=S_1, S_2, \ldots, S_n$, which maximizes the conditional probability $P(S|W)=P(S_1, S_2, \ldots, S_n|w_1, w_2, \ldots, w_n)$ with the word $w_i$ aligning with state $S_i$ ($1 \le i \le n$).

According to Bayes's rule, the result is $$S = \text{argmax}_S P(S|W) = \text{argmax}_S P(W,S)/P(W) = \text{argmax}_S P(W,S),$$

where the last equal relation comes from the fact that $P(W)$ is independent of the state sequence $S$. Based on the ergodic Markov chain model defined in equation (8), the joint probability could be rewritten as:

$$P(W, S) = \prod_{i=0}^{n+1} P(w_{i+1}, S_{i+1}|w_i, S_i)$$

with $w_0$=GENERAL_START, $w_{n+1}$=GENERAL_END, $S_0=S_{n+1}=s_0$. Therefore, the task of name entity extraction is to find the optimal state sequence $S$ that maximizes the joint probability $P(W,S)$. This may be performed efficiently using the Viterbi algorithm. Denoting $Q(w_t,S_t)$ as the accumulated score at $t$ ($1 \le t \le n$) with the word $w_t$ aligned with the state $S_t$; $\Psi_t(S_t)$ is the state at $t-1$ from which the accumulated probability at $(w_t, S_t)$ is the highest among all transitions from $(w_{t-1}, s_i)$ with $0 \le i \le n$, the Viterbi algorithm is stated as follows:

(1) Initialization: $I(\text{GENERAL\_START}, s_0)=1$.
(2) When $t=1$,
    for ($i=0$; $i \le K$; $i$++)
    $Q(w_1, s_i)=I(\text{GENERAL\_START}, s_0)*P(w_1, s_i|\text{GENERAL\_START}, s_0)$,
    $\Psi_1(s_i)=s_0$.
(3) Recursion: when $2 \le t \le n$,
    for ($t=2$; $t \le n$; $t$++)
    for ($i=0$; $i \le K$; $i$++)
    $Q(w_t, s_i)=\max_j(Q(w_{t-1}, s_j)P(w_t, s_i|w_{t-1}, s_j))$,
    $\Psi_t(s_i)=\text{argmax}_j Q(w_{t-1}, s_j)P(w_t, s_i|w_{t-1}, s_j))$.
(4) Termination: when $t=n+1$,
    $Q(\text{GENERAL\_END}, s_0)=\max_j(Q(w_n, s_j)P(\text{GENERAL\_END}, s_0|w_n, s_j)$,
    $\Psi_{n+1}(s_0)=\text{argmax}_j Q(w_n, s_j)P(\text{GENERAL\_END}, s_0|w_{t-1}, s_j))$.
(5) Trace back to get the optimal state sequence $S_0, S_1, \ldots, S_n$.
    $S_{n+1}=s_0$
    for ($t=n$; $t \ge 0$; $t$--) $S_t=\Psi_{t+1}(S_{t+1})$.

In this optimal state sequence, any contiguous words aligned with a state other than the one of the general language model is tagged and labeled as the corresponding name entity.

Figure 7A:
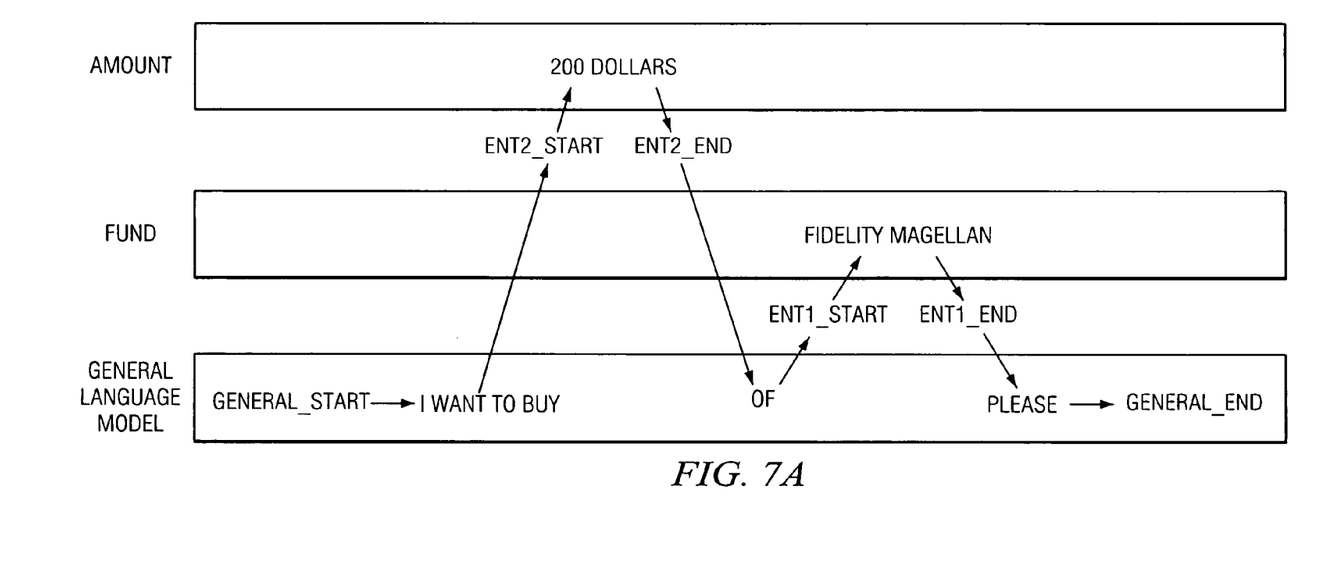
FIGS. 7A and 7B depict a decoding for an example sentence in accordance with a preferred embodiment of the present invention.
Figure 7B:
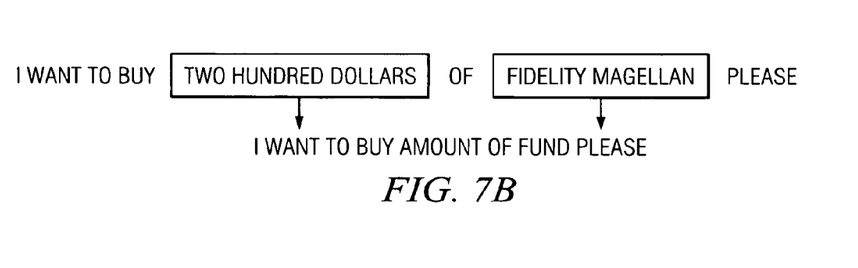

With reference now to FIG. 7A, a decoding for an example sentence is illustrated in accordance with a preferred embodiment of the present invention. The name extraction mechanism of the present invention is used to decode the following sentence:

i want to buy 200 dollars of fidelity magellan please

If the interested name entities are FUND and AMOUNT, there are three states in total. One corresponds to the general language model, denoted by $s_0$; the second corresponds the bigram language model of FUND, denoted by $s_1$; the third corresponds to the finite-state language model of AMOUNT, denoted by $s_2$. As shown in FIG. 6A, at $t=0$ (the first step of the Viterbi algorithm), the word GENERAL_START is aligned with state $s_0$. At $t=1$ (the second step of the Viterbi Algorithm), the accumulated probabilities of the word $w_1$="i" aligned with $S_1=s_0$, $s_1$ and $s_2$ are calculated and denoted as $Q(w_1,s_0)$, $Q(w_1, s_1)$ and $Q(w_1, s_2)$ respectively. The best previous state at time $t=1$ for each of these states are $s_0$ (the state aligned with GENERAL_START). At $t=2$ (step 3 of the Viterbi algorithm), the score of $Q(w_2, S_2)$, where $w_2$="want" and $S_2 = s_0$, $s_1$ and $s_2$, are calculated as follows:

$$Q(w_2, s_0) = \max(Q(w_1, s_0)P(w_2, s_0|w_1, s_0), Q(w_1, s_1)P(w_2, s_0|w_1, s_1), Q(w_1, s_2)P(w_2, s_0|w_1, s_2)),$$

$$Q(w_2, s_1) = \max(Q(w_1, s_0)P(w_2, s_1|w_1, s_0), Q(w_1, s_1)P(w_2, s_1|w_1, s_1), Q(w_1, s_2)P(w_2, s_1|w_1, s_2)),$$

$$Q(w_2, s_2) = \max(Q(w_1, s_0)P(w_2, s_2|w_1, s_0), Q(w_1, s_1)P(w_2, s_2|w_1, s_1), Q(w_1, s_2)P(w_2, s_2|w_1, s_2)),$$

FIG. 6B shows how the score $Q(w_2, s_1)$ is calculated. There are transitions to $(w_2, s_1)$ from $(w_1, s_0)$, $(w_1, s_1)$, and $(w_1, s_2)$ respectively. The solid arrow line in FIG. 6B (from $(w_1, s_0)$ to $(w_2, s_1)$) has the best accumulated score among all these three transitions. Therefore, the best previous state of $s_1$ at $t=2$ is $\Psi_2(s_1) = s_0$. Similarly, we can calculate the best accumulate score for $Q(w_2, s_0)$ and $Q(w_2, s_2)$ and their best previous states $\Psi_2(s_0)$ and $\Psi_2(s_2)$ respectively. At the end (step 4 of the Viterbi algorithm), we calculate the best accumulated score of $Q(w_{11}, s_0)$ where $w_{11}$="GENERAL_END" and found its best previous state to be $\Psi_{11}(s_0) = s_0$. By tracing back, the best previous state of $s_0(= \Psi_{11}(s_0))$ at $t=10$ is $\Psi_{10}(s_0) = s_1$, and the best previous state of $s_1 (= \Psi_{10}(s_0))$ at $t=9$ is $s_1$, and so on. Finally, we get the best state sequence:

$$\Psi_1 = s_0, \Psi_2 = s_0, \Psi_3 = s_0, \Psi_4 = s_0, \Psi_5 = s_0, \Psi_6 = s_2, \Psi_7 = s_2, \Psi_8 = s_0, \Psi_9 = s_1, \Psi_{10} = s_1, \Psi_{11} = s_0$$

The words aligned with the above state sequence are:

GNEERAL_START i want to buy 200 dollars of fidelity magellan please ($w_0$=GNEERAL_START, $w_1$=i, ... $w_{10}$=please. $w_t$ aligns with $\Psi_{t+1}$, because $\Psi_{t+1}$ is the best previous state). The best state sequence aligning with the above word sequence is depicted in FIG. 7A.

Figures 8, 9:
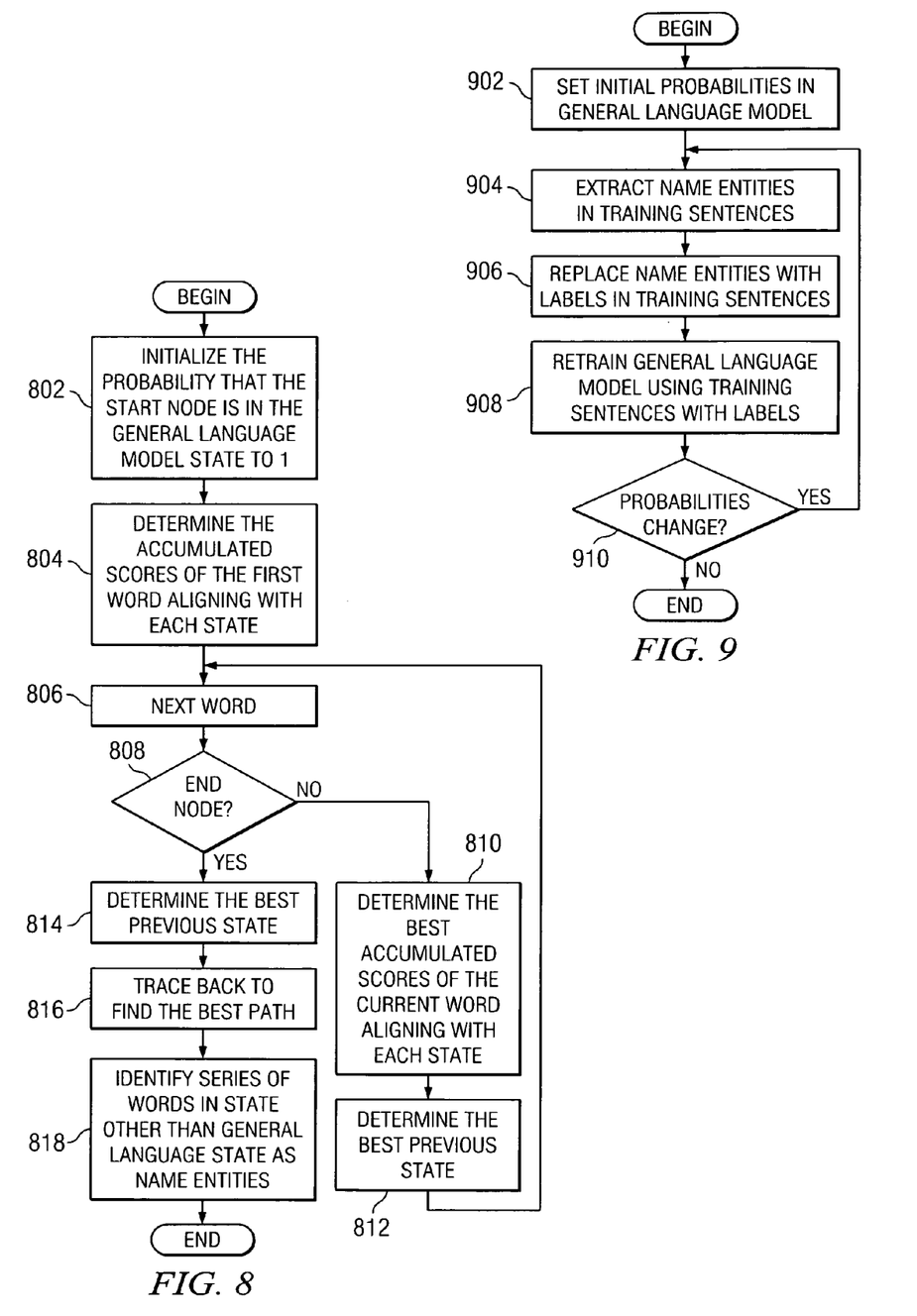
FIG. 8 is a flowchart illustrating the operation of a natural language extraction mechanism in accordance with a preferred embodiment of the present invention.
FIG. 9 is a flowchart illustrating the operation of an iterative decoding and retraining process in accordance with a preferred embodiment of the present invention.

With reference to FIG. 8, a flowchart is shown illustrating the operation of a natural language extraction mechanism in accordance with a preferred embodiment of the present invention. The process begins and initializes the probability that the start node is in the general language model state to 1 (step 802). For the first word in the utterance, the process determines the accumulated scores of the first word aligning with each language model state (step 804). Then, the next word is considered (step 806) and a determination is made as to whether the end node is reached (step 808). If the end node is not reached, the process determines the best accumulated scores of the current word aligning with each language model state (step 810), determines the best previous state (step 812), and returns to step 806 to consider the next word.

If, however, the end node is reached in step 808, the process determines the best previous state (step 814). Thereafter, the process traces back to find the best path (step 816) and identifies any series of words aligned with a state other than the general language state as name entities (step 818). Then, the process extracts the identified name entities (step 820) and ends.

In the above algorithm, it is assumed that a sufficient amount of annotated utterances is used to train the general language model. More particularly, the probabilities $G(ENT_i|w_t)$ and $G(w_t|ENT_i)$ can be calculated only when there is boundary information of name entities in the utterances. In practice, this is very expensive. In accordance with a preferred embodiment of the present invention, a technique is provided to iteratively decode the natural language utterances and update the general language model.

First, all the natural language utterances are decoded using the probability distribution defined in equation (9).

$$P(w_t, S_t|S_{t-1}, w_{t-1}) = \begin{cases} (1-\alpha)G(w_t|w_{t-1})/(K+1), & \text{if } S_{t-1} = S_t = s_0, \\ \alpha E_i(w_t|ENT_i\_START)/(K+1), & \text{if } S_{t-1} = s_0, S_t = s_i \neq s_0, \\ \beta E'_i(ENT_i\_END|w_{t-1})/(|V|(K+1)), & \text{if } S_{t-1} = s_i \neq s_0, S_t = s_0, \\ \gamma E_i(ENT_i\_END|w_{t-1})E_j(w_t|ENT_j\_START)/(K+1), & \text{if } S_{t-1} = s_i \neq s_0, S_t = s_j \neq s_0, s_i \neq s_j, \\ [1-(\alpha+\gamma)E_i(ENT_i\_END|w_{t-1})]E_i(w_t|w_{t-1})/(K+1), & \text{if } S_{t-1} = S_t = s_i \neq s_0, \end{cases} \quad (9)$$

where $|V|$ is the vocabulary size, $\alpha$ is a large value such as 0.999, $\beta$ and $\gamma$ are small values such as 0.001.

Equation (9) is derived from (8) by assuming a flat probability distribution of $G(ENT_i|w_t)$, $G(w_t|ENT_i)$ as well as $G(ENT_j\_START|ENT_i\_END)$, and properly adjusting the parameters $\alpha_i$, $\beta_i$, $\gamma_{ij}$ ($1 \leq i \leq K$). Apparently, $P(w_t, S_t|S_{t-1}, w_{t-1})$ satisfies the unitary condition:

$$\sum_{w_t, S_t} P(w_t, S_t|S_{t-1}, w_{t-1}) = 1.$$

After the initial decoding of all the raw natural language utterances using the probability distribution of (9), an iterative retraining technique is used to calculate the probabilities $G(ENT_i|w_t)$, $G(w_t|ENT_i)$ and $G(ENT_j\_START|ENT_i\_END)$ as well as other bigram probabilities in the general language model. Then, the probabilities defined in equation (8) are used to re-decode the raw utterance and update the general language model with which we can decode the raw data again. This process may repeat until the decoded result, and therefore the general language model, does not change. In this way, a name entity extractor may be achieved without manually annotating a large amount of text data.

Turning now to FIG. 9, a flowchart illustrating the operation of an iterative decoding and retraining process is shown in accordance with a preferred embodiment of the present invention. The process begins and sets initial probabilities in the general language model (step 902). Then, the process extracts name entities in a corpus of training sentences (step 904) and replaces the name entities with name entity labels in the training sentences (step 906). The process then retrains the general language models using the training sentences with name entity labels (step 908) and a determination is made as to whether probabilities in the general language models have changed (step 910). If the general language model has changed, the process returns to step 904 to re-decode the training sentences and retrain the general language model; otherwise, the process ends.

The decode-and-retrain technique allows a developer to build a name entity extractor without manually annotate large amount of natural language utterances. However, the technique still requires a large amount of text utterances to be collected. Data collection is an expensive process which requires a lot of money and time. Furthermore, collected data is usually domain-dependent and the resulting model is also domain-dependent. Therefore, the model obtained from one application cannot be applied to other applications to extract the same name entity.

Thus, in accordance with a preferred embodiment of the present invention, a uniform bigram language model is used for the general language model. The uniform bigram language model is defined as follows:

$$P(w_i|w_j) = \text{a small number}, \forall w_i, w_j. \quad (10)$$

The probability defined by equation (10) is not a true probability distribution. This uniform probability distribution is introduced to provide some background probability value for word pairs that are impossible to appear in the name entities.

Using the uniform bigram language model for the general language model makes it unnecessary to collect a large amount of domain-dependent natural language utterances to train the general language model. It also makes the approach domain-independent and the vocabulary size is infinite.

The present invention provides an automatic, extensible and domain-independent name entity extraction technique. The name entity extraction technique of the present invention allows name entity language models to be reused, expedites the development process, and improves consistency and recognition performance. The context of the name entities could be drastically different in different applications. Therefore, the models for these name entities based on the context information could be quite different from application to application. However, the way to say the name entities themselves, regardless of the context around them usually conforms to some regular formats. Usually name entities could be recognized without the information of their surrounding contexts. In the name entity extraction method of the present invention, the linguistic information within the name entities themselves is emphasized. The context information around the name entities are encoded by, in case of bigram language model, the probabilities $G(w_i|ENT_j)$, $G(ENT_i|w_t)$ and $G(ENT_i|ENT_j)$ where ($1 <= i$, $j <= (K+1)$). Rather than manually annotating a set of domain-dependent data to train the statistical model, the only effort made in this approach is to build domain-independent linguistic models for name entities, and use the conventional statistical methods to decode unsupervisedly.

The technique of the present invention is also extensible. Once the model of a name entity is established, the model can be directly applied to other domains of application. The decoding algorithm can accept any number of models of name entities and simultaneously extract all interested name entities at the end of the decoding. With this new technique, developers can build generic models for some commonly seen name entities, such as currency amount, location, date, time etc. In a new application, one can reuse the development work that was done in some previous applications, and develop the models for the name entities specific to this new domain. The newly developed models could again be reused in future applications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for name entity extraction, comprising:

providing a general language model and one or more name entity language models, wherein the general language model and the one or more name entity language models are associated with a plurality of states including a general language model state and one or more name entity language model states associated with the one or more name entity language models;

receiving a natural language utterance;

starting at a start node in the general language model, for each word in the natural language utterance, determining a best current state in the plurality of states and a best previous state in the plurality of states, until an end node in the general language model is reached;

tracing back to determine a best path from the start node to the end node;

identifying two or more adjacent words in the natural language utterance aligned with a name entity language model state as a name entity; and extracting the name entity.

2. The method of claim 1, wherein the step of determining a best current state in the plurality of states includes determining accumulated probability scores of the first word in the natural language utterance aligning with each state.

3. The method of claim 1, wherein the step of determining a best current state in the plurality of states includes determining a best accumulated probability score of a current word in the natural language utterance aligning with each state.

4. The method of claim 1, further comprising:
replacing the extracted name entity in the natural language utterance with a name entity label to form a modified natural language utterance.

5. The method of claim 4, further comprising:
training the general language model using the modified natural language utterance.

6. The method of claim 1, further comprising:
labeling the extracted name entity in the natural language utterance to form a labeled natural language text; and
providing the labeled natural language text to a natural language understanding parser.

7. The method of claim 1, wherein probabilities in the general language model are uniformly distributed.

8. A method, in a data processing system, for name entity extraction, comprising:
a) providing a general language model;
b) setting initial probabilities in the general language model;
c) extracting name entities in a plurality of training sentences;
d) replacing the extracted name entities with name entity labels in the plurality of training sentences to form modified training sentences;
e) training the general language model using the modified training sentences; and
f) repeating steps (c) to (e) until probabilities the general language model do not change.

9. The method of claim 8, wherein the step of setting initial probabilities in the general language model includes training the general language model using the plurality of training sentences.

10. An apparatus for name entity extraction, comprising:
means for providing a general language model and one or more name entity language models, wherein the general language model and the one or more name entity language models are associated with a plurality of states including a general language model state and one or more name entity language model states associated with the one or more name entity language models;
means for receiving a natural language utterance; means, starting at a start node in the general language model, for each word in the natural language utterance, for determining a best current state in the plurality of states and a best previous state in the plurality of states, until an end node in the general language model is reached;
means for tracing back to determine a best path from the start node to the end node;
means for identifying two or more adjacent words in the natural language utterance aligned with a name entity language model state as a name entity; and
means for extracting the name entity.

11. The apparatus of claim 10, wherein the means for determining a best current state in the plurality of states includes means for determining accumulated probability scores of the first word in the natural language utterance aligning with each state.

12. The apparatus of claim 10, wherein the means for determining a best current state in the plurality of states includes means for determining a best accumulated probability score of a current word in the natural language utterance aligning with each state.

13. The apparatus of claim 10, further comprising:
means for replacing the extracted name entity in the natural language utterance with a name entity label to form a modified natural language utterance.

14. The apparatus of claim 13, further comprising:
means for training the general language model using the modified natural language utterance.

15. The apparatus of claim 10, further comprising:
means for labeling the extracted name entity in the natural language utterance to form a labeled natural language text; and
means for providing the labeled natural language text to a natural language understanding parser.

16. The apparatus of claim 10, wherein probabilities in the general language model are uniformly distributed.

17. An apparatus for name entity extraction, comprising:
a processor; and
a memory electrically connected to the processor, the memory having stored therein a program to be executed on the processor for performing the following steps:
a) providing a general language model;
b) setting initial probabilities in the general language model;
c) extracting name entities in a plurality of training sentences;
d) replacing the extracted name entities with name entity labels in the plurality of training sentences to form modified training sentences;
e) training the general language model using the modified training sentences; and
f) repeating steps (c) to (e) until probabilities the general language model do not change.

18. The apparatus of claim 17, wherein the means for setting initial probabilities in the general language model includes means for training the general language model using the plurality of training sentences.

19. A computer program product, in a computer readable medium, for name entity extraction, comprising:
instructions for providing a general language model and one or more name entity language models, wherein the general language model and the one or more name entity language models are associated with a plurality of states including a general language model state and one or more name entity language model states associated with the one or more name entity language models;
instructions for receiving a natural language utterance;
instructions for, starting at a start node in the general language model, for each word in the natural language utterance, determining a best current state in the plurality of states and a best previous state in the plurality of states, until an end node in the general language model is reached;
instructions for tracing back to determine a best path from the start node to the end node;
instructions for identifying two or more adjacent words in the natural language utterance aligned with a name entity language model state as a name entity; and
instructions for extracting the name entity.

20. A computer program product, in a computer readable medium, for name entity extraction, comprising:
a) instructions for providing a general language model;
b) instructions for setting initial probabilities in the general language model;
c) instructions for extracting name entities in a plurality of training sentences;
d) instructions for replacing the extracted name entities with name entity labels in the plurality of training sentences to form modified training sentences; and
e) instructions for training the general language model using the modified training sentences, wherein instructions (c) to (e) are repeated until probabilities the general language model do not change.

* * * * *